United States Patent [19]

Reese

[11] Patent Number: 4,597,789
[45] Date of Patent: Jul. 1, 1986

[54] TUNGSTEN ALLOY BENDING MOLD INSERTS

[75] Inventor: Thomas J. Reese, Sarver, Pa.

[73] Assignee: PPG Industries, Inc., Pittsburgh, Pa.

[21] Appl. No.: 764,465

[22] Filed: Aug. 12, 1985

[51] Int. Cl.⁴ .............................................. C03B 23/02
[52] U.S. Cl. ......................................... 65/106; 65/24; 65/287; 65/289; 65/374.12
[58] Field of Search ..................... 65/24, 374.12, 106, 65/107, 287, 289, 290, 273

[56] References Cited

U.S. PATENT DOCUMENTS

| | | | |
|---|---|---|---|
| 3,184,259 | 5/1965 | Almdale | 294/86 |
| 3,443,922 | 5/1969 | Settino | 65/374.12 |
| 3,976,462 | 8/1976 | Sutara | 65/289 |
| 4,119,428 | 10/1978 | De Angelis et al. | 65/287 |
| 4,159,842 | 7/1979 | Perkowski | 294/118 |

Primary Examiner—Arthur Kellogg
Attorney, Agent, or Firm—Andrew C. Siminerio

[57] ABSTRACT

A shaping rail uses tungsten alloy inserts to support a glass sheet during sag bending. As the glass sheet is heated and sags to shape, tungsten alloy inserts provide support points over which the glass sheet can slide without scuffing the glass sheet surface or embedding particles in the glass sheet that can result in venting.

15 Claims, 4 Drawing Figures

TUNGSTEN ALLOY BENDING MOLD INSERTS

BACKGROUND OF THE INVENTION

1. Field of Invention

This invention relates to bending glass sheets by the gravity sag technique and particularly, relates to the use of tungsten alloy inserts to support the glass sheets during bending to reduce marking during the glass sheet bending operation.

2a. Technical Considerations

Glass sheets are commonly bent by a gravity sagging technique in which one or more flat glass sheets are mounted on an outline mold comprising a rigid metal rail disposed edge-wise with its upper edge forming a surface that conforms in elevation and outline to the shape desired slightly inboard of the bent glass sheet perimeter. The flat glass sheets are supported at selected points on the mold, usually at the corners. As the glass sheets are heated to their heat deformation temperature, they sag under the force of gravity and conform with the elevational contours of the mold rail. Since the length of the chord between ends of the shaped glass sheet is shorter than the distance between the ends of the flat glass sheet before bending, the glass sheet directly supported by the mold rail must slide over its initial support points. The friction between the hot glass sheet and the hot mold results in scuff marks on the glass surface. In addition, oxidized metal particles from the shaping rail that is in prolonged contact with the hot glass sheet, such as the support points, can become embedded in the glass sheet, resulting in additional visual defects and possible venting of the glass.

After the sheets are shaped, the mold is cooled to minimize excessive sagging of the glass sheets within the outline mold. The shaped glass sheet so cooled is then removed from the mold, inspected, and further processed.

When glass sheets are shaped to relatively deep bends, the length of the chord between the ends of the bent glass sheet are even shorter, which results in additional marking of the glass sheet. In order to reduce this sliding between the glass sheet and the metal rail, the mold is designed to include articulating end rail sections whose contours conform to the outline and shape desired for the longitudinal end portions of the glass sheet to be bent. The end rail section is constructed and counterweighted to pivot downward into an open position to support the mass of the relatively stiff flat glass sheet to be bent and to pivot upward into a closed position when the glass sheet is softened by heat. When in the closed position the end rail sections cooperate with additional shaping rails in the central non-articulating portions of the mold to form a substantially continuous outline shaping surface conforming in contour and elevation to the shape desired for the glass sheet. Although the use of an articulated mold helps reduce scuff marks on the glass sheet surface, there is still sliding of the glass sheet over its initial support points which results in glass sheet marking as well as the previously discussed embedded particle marking.

When a bent glass sheet has excessive marking it is rejected during inspection. It would be useful to find a way to reduce the marking of the glass sheets due to the mold support so as to increase the yield percentage of the bent glass.

2b. Patents of Interest

U.S. Pat. No. 3,184,259 to Almdale relates to steel articles provided with carbide inserts such as screw members used on tongs for handling hot glass sheets in a vertical press bending operation. The invention teaches a method of joining a cemented carbide insert of one or more heavy metals such as tungsten, vanadium, or titanium to an insert supporting steel body.

U.S. Pat. No. 3,976,462 to Sutara teaches the use of thin sheet metal members to cover selected portions of the metal rail in a bending mold that directly contact the glass sheet for an extended period of time during the bending operation. The metal reacts to changes in temperature in the atmosphere in which the glass sheet is bent more nearly like the reaction of the glass sheet itself so as to reduce the high thermal gradient that generally exists between the portion of the glass sheet in contact with critical portions of the mold shaping rail and the other portion of the glass sheet that do not make as long a contact or make no contact whatsoever with the mold rail throughout the heating phase of the bending operation.

U.S. Pat. No. 4,159,842 to Perkowski teaches a self closing tong for vertical press bending wherein the glass engaging member of the tong is composed of a tungsten nickel copper composite essentially free of cobalt and iron. Tongs of this type reduce marring and weakening of the glass sheet in the vicinity where the tongs penetrate the sheet surface.

U.S. Pat. No. 4,119,428 to DeAngelis teaches an adjustable gravity sag bending mold with pairs of cylindrically shaped flat glass supporting members attached longitudinally outward and slightly upward of the transverse end portions of the end shaping rails. The flat glass sheets are positioned on the supporting members and as the glass is heated and begins to sag, the glass sheet surface that is in contact with the supporting members slides over the rounded surface of the supporting members to reduce glass sheet marking at the supports. In addition, the entire mold is tilted a small angle downward to the horizontal to provide resistance to transverse sliding of the glass sheet when the mold is accelerated rapidly at the glass sheet loading station for movement through the bending lehr. The flat glass sheet supporting members are stainless steel rods with a ¼ inch (0.64 cm.) diameter.

SUMMARY OF THE INVENTION

The present invention provides a bending mold for shaping a hot glass sheet by sag bending that includes a glass sheet support frame having a shaping rail with a support surface that conforms in elevation and outline to the desired shape of the sheet to be shaped slightly inboard of the glass sheet perimeter and tungsten metal containing inserts, preferably a tungsten alloy, positioned at selected positions on the rail to support the glass sheet on the frame during the sag bending. The selected positions are support points on the rail that remain in direct contact with the glass sheet prior to, during, and after the sag bending. The inserts have a glass sheet contacting surface in alignment with the support surface of the shaping rail to form a continuation of the support surface.

In one embodiment of the invention the support frame includes a central mold portion having opposed end portions and central shaping rails and at least one end mold section having an end mold shaping rail and at least one sheet support point having a first insert. The end mold section is pivotally mounted to each of the opposed end portions of the central mold portions to define a bending mold. A second insert is positioned at the cut points of the bending mold. The first and second inserts are at the selected positions such that the inserts support the glass sheet to be shaped prior to the sag bending. The sheet to be shaped is supported by the first and second inserts, the central shaping rails, and the end mold shaping rails after being shaped.

The present invention also provides an improvement in sag bending wherein the glass sheet to be shaped is contacted and supported at selected portions of a shaping rail by tungsten alloy inserts prior to, during, and after the heating step in a sag bending operation. The inserts at the selected portions remain in contact with the glass shape during heating of the sheet for a greater time than the remaining rail portions.

DESCRIPTION OF THE PREFERRED EMBODIMENT

Figure 1:
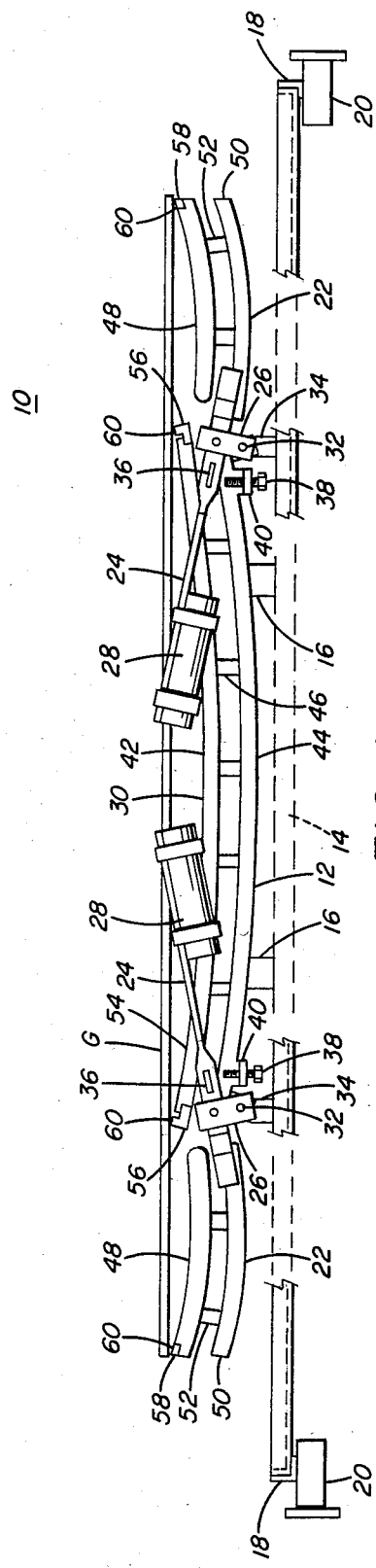
FIG. 1 is a longitudinal elevational view of a glass sheet supported on an articulating sectionalized mold in the sheet supporting position. The mold incorporates the mark reducing inserts of the present invention for bending glass sheets by the gravity sag technique.
Figure 2:
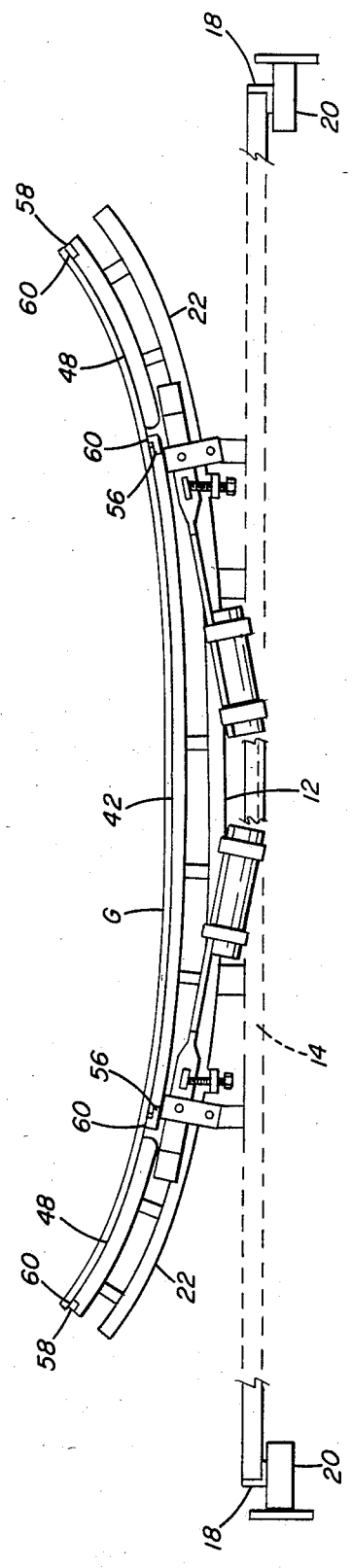
FIG. 2 is a view of the mold of FIG. 1 in the closed mold position after the sheet has been shaped.

Referring to FIGS. 1 and 2, an articulating glass bending mold 10 incorporating the present invention is shown comprising a central mold portion 12 carried on a mold carrying frame 14 by frame support post 16. This mold 10 is similar to the mold taught in U.S. Pat. No. 3,976,462 to Sutara which teachings are herein incorporated by reference.

The mold carrying frame 14 is also provided with a pair of end rails 18 extending transversely of the mold carrying frame 14 at the opposite longitudinal ends thereof. The rails 18 ride on successive rolls 20 through a bending and annealing lehr wherein the glass laden molds 10 are first heated to a temperature sufficient to heat soften the supported glass and subsequently cooled after the glass has attained its shape.

The bending mold 10 includes two end mold sections 22 each of which flank the central mold section 12. Lever arms 24 having reinforcing tabs 26 are attached to each end mold section 22 and are provided with counterweights 28 at their longitudinal inward extremities. Lever arms 24 are positioned laterally outside the shaping rails 30 of the bending mold 10. The bottom portions of the reinforcing tabs 26 make pivotal attachment with bearing rods 32. The latter are carried by posts 34 that extend downward from the under surface of the central mold section 12 to frame 14.

Each end mold section 22 is rotatable relative to the central mold section 12 by virtue of the pivotal connection between the reinforcement tabs 26 and the bearing rods 32. The counterweights 28 tend to rotate the end mold sections 22 about the bearing rods 32 into the closed mold position depicted in FIG. 2 from the open mold position shown in FIG. 1. Each lever arm 24 is provided with a ledge 36 whose undersurface is engageable with an adjustable screw 38. The latter is screw threaded through an apertured angular plate 40 fixed to the center section 12. This defines the closed position of the end mold sections 22 relative to the central mold section 12 and prevents excessive rotation of the end mold sections.

The shaping rail 30 of the mold 10 includes a shaping rail 42 supported from rigid reinforcing bar 44 by tabs 46 in the central mold portion 12 and a shaping rail 48 supported from reinforcing bar 50 by tabs 52 in each end mold section 22. Reinforcing bar 44 in central mold section 12 is rigidly attached to carrying frame 14 by posts 16, and reinforcing bar 50 in each mold section 22 is pivotally mounted on frame 14 through the reinforcing tabs 26 and posts 34. When the end mold sections 22 are in their pivotal upright and closed position, as shown in FIG. 2, the elevational contour of supporting surface 54 of the shaping rail 30 defines the final desired contours of the shaped glass sheet slightly inboard of the glass sheet perimeter. Although not limited in the present invention, the shaping rail 30 is preferably made of stainless steel.

The rails 42 of the central mold section 12 extend to rail end portions 56 which are commonly referred to as the cut point. When flat glass sheets are mounted on the molds 10 for bending, the end mold sections 22 are rotated to the position depicted in FIG. 1 so that the flat glass sheet G is supported at its longitudinal extremities on end mold section 22 at corner portions 58 and intermediate its extremities on cut points 56. When the glass sheet G is softened by application of heat as the mold 10 moves through the bending lehr, the counterweights 28 rotate the tabs 26 thus rotating the end mold sections 22 upward and inward into the closed position so that the end mold section rails 48 move closer to the cut points 56 of the central mold section rail 42 and form the substantially continuous shaping rail 30.

As the glass sheet G remains in contact with the cut points 56 and corner portions 58 during the heating of the sheet, and subsequently begins to sag, the end mold portions 22 pivot into closed position. The glass sheet G slides relative to its support at the cut points 56 and corner portions 58 resulting in scuff marks and particle marks on the glass surface. Excessive marking on the glass sheet results in rejection of the bent glass sheet.

In an effort to reduce this marking, testing was directed towards the use of machineable tungsten alloys that could be formed into specific shapes as required by different mold configurations. A machineable heavy tungsten alloy sold by Kennametal Inc., Latrobe, Pa. under the trademark Kennertium was tested. Kennertium alloy is available in different grades with varying amounts of tungsten metal. Grade W-10 which is 90% tungsten and 10% nickel, copper, and iron, by weight, was chosen for testing. This tungsten alloy has a Rockwell C hardness of 26 to 30 and a thermal expansion at 1200° F. (649° C.) of $3.75 \times 10^{-6}$ inches per inch per °F. ($6.75 \times 10^{-6}$ cm per cm per °C.).

Initial trials using Kennertium alloy grade W-10 inserts mounted on selected molds 10 produced light scuff marks on the glass sheets at the support points. Although not limited in this invention, the inserts 60 are preferably mounted and aligned on the support rails 11 such that the glass sheet contacting surface 62 of the insert 60 forms a continuation of the upper supporting surface 54 of support rails 30. In later trials the inserts 60 were polished and allowed to oxidize by the lehr heat. The result showed improved surface quality with very little marking on the glass surface. Because of the reduced surface damage, the amount of rejected glass due to surface damage decreased and the yield percentage of the shaped glass sheets increased.

It is believed the improved glass quality is due to the fact that the tungsten in the alloy oxidizes when heated. The tungsten oxide coats the insert 60 so that the glass sheet does not stick to the glass sheet as it does to the oxidized stainless steel shaping rails 42 and 48 at the cut points 56 and corner portions 58. The reduced sticking reduces abrasion between the two surfaces and subsequent marking. An additional advantage to using a tungsten alloy insert is that the oxidized stainless steel rails in the lehr tend to embed dark brown oxidized particles in the hot glass at points that are in contact with the shaping rail over an extended period of time, i.e. cut points 56 and corner portions 58. These embedded particles add to the visual degradation of the bent glass sheet and can also produce venting, both of which will reduce yield percentage. It was found that the tungsten oxide coating which is white in color, does not embed any particles in the glass that can be seen with the unaided eye.

The use of the tungsten alloy inserts unexpectedly reduced another problem. As glass laden molds 10 are rapidly accelerated from a glass loading station into the heating lehr, the glass sheets G tend to slide and misalign, resulting in misshaped and rejectable glass. It was found that glass sheets supported on the tungsten alloy inserts tended not to slide and misalign on the bending mold as much as glass sheets on stainless steel rails of standard bending molds that are coated with graphite at the cut points 56 and corner portions 58, as it is conveyed through the lehr. This unexpected benefit further increased yield percentage for the bent glass.

It is believed that other tungsten alloys with varying amounts of tungsten such as Kennertium alloy grade W-5 which is 95% tungsten by weight and grade W-2 which is 97.4% tungsten by weight or tungsten alloys with as little as 75% tungsten by weight would be equally as effective in reducing marking and other visual defects in the bent glass sheets.

Figure 3:
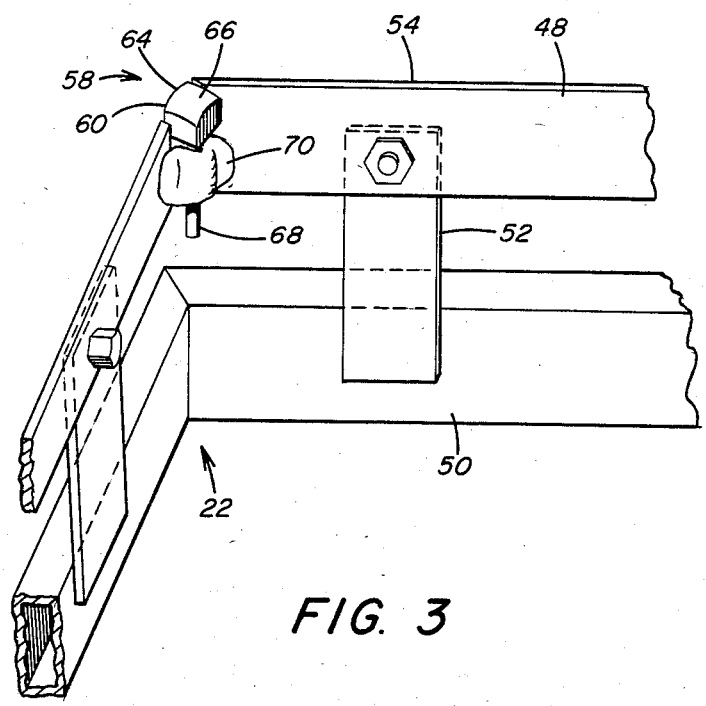
FIG. 3 is an enlarged isometric view of a corner portion of the mold of FIG. 1, with portions removed for clarity, showing the insert of the present invention.
Figure 4:
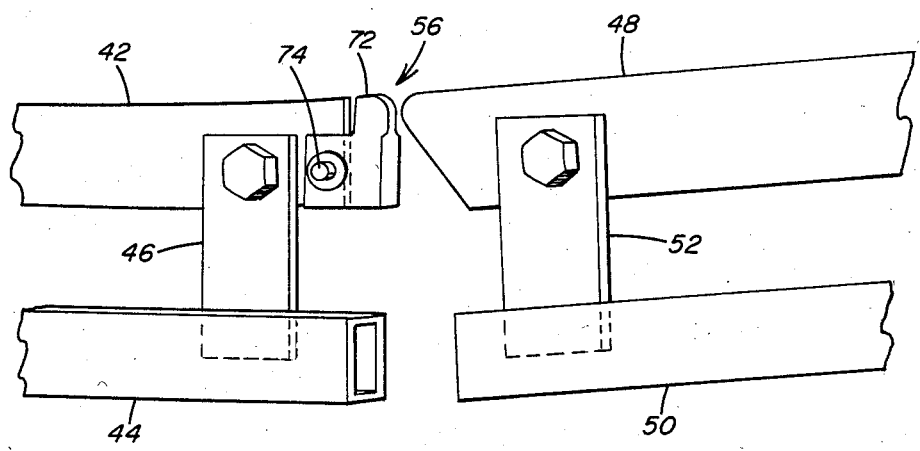
FIG. 4 is an enlarged elevational view of the cut points of the mold in FIG. 1, with portions removed for clarity, showing the inserts of the present invention.

FIGS. 3 and 4 illustrate specially shaped inserts 60 installed at the corner portions 58 and cut points 54, respectively. The insert 60 can be installed in any convenient manner. For example and with reference to FIG. 3, the shaping rail 48 of the end mold section 22 is stepped at corner portion 58 to permit head portion 64 of an insert 66 to be fitted flush with the supporting surface 54. A post 68 extends downward from the head portion 64 and is mechanically attached to the shaping rail 48 by enveloping it with weld material 70. FIG. 4 illustrates the preformed insert 72 being held in place at cut point 56 by a pop rivet 74. It has been found that the tested tungsten alloy can be successfully heli-arc welded directly to the shaping rails. This allows the size of the insert to be reduced, thus simplifying installation and reducing costs.

The forms of the invention shown and described herein represent illustrative embodiments, and it is understood that various changes may be made without departing from the scope of the invention.

I claim:

1. A bending mold for shaping a hot glass sheet by sag bending comprising:
   a glass sheet support frame having a shaping rail with a support surface that conforms in elevation and outline to the desired shape of the sheet to be shaped slightly inboard of the glass sheet perimeter; and
   tungsten metal containing inserts positioned at selected positions on said rail to support said glass sheet on said frame during said sag bending.

2. The bending mold as in claim 1 wherein said selected positions are support points on said rail that remain in direct contact with said glass sheet prior to, during, and after said sag bending.

3. The bending mold as in claim 2 wherein said inserts have a glass sheet contacting surface in alignment with said support surface of said shaping rail to form a continuation of said support surface.

4. The bending mold of claim 3 wherein said frame includes:
   a central mold portion having opposed end portions and central shaping rails;
   at least one end mold section having an end mold shaping rail and at least one sheet support point having a first insert;
   means for pivotally mounting said edge mold section to each of said opposed end portions of said central mold portion to define a bending mold;
   a second insert at the cut points of said bending mold; and
   wherein said first and second inserts are at said selected positions such that said inserts support said glass sheet to be shaped prior to said sag bending and said sheet to be shaped is supported by said first and second inserts, said central shaping rails, and said end mold shaping rails after being shaped.

5. The bending mold as in claim 1 wherein said tungsten metal containing insert is a tungsten alloy.

6. The bending mold as in claim 5 wherein said tungsten metal containing insert is principally tungsten.

7. The bending mold as in claim 6 wherein tungsten alloy is at least 75% tungsten.

8. The bending mold as in claim 7 wherein said tungsten alloy is approximately 90% tungsten.

9. In the art of shaping glass sheets by sag bending including the steps of positioning a glass sheet to be shaped on a support frame having a shaping rail with a support surface that conforms in elevation and outline to the desired shape of the sheet to be shaped slightly inboard of the glass sheet perimeter, supporting said glass sheet at selected portions of said shaping rail, heating said glass sheet to its deformation temperature so that said glass sheet sags into contact with the remaining rail portions of said shaping rail, the improvement comprising:
   contacting said glass sheet at said selected portions with tungsten metal containing inserts to support said glass sheet to be shaped prior to, during, and after said heating step.

10. The improvement as in claim 9 wherein said selected portions remain in contact with said glass sheet to be shaped for a greater time during said heating step than said remaining rail portion.

11. The improvement as in claim 10 further including the step of aligning a glass sheet contacting surface of said inserts with said support surface of said shaping rail so as to form a continuation of said support surface.

12. The improvement as in claim 11 wherein said tungsten metal containing insert is a tungsten alloy.

13. The improvement as in claim 12 wherein said tungsten metal containing insert is principally tungsten.

14. The improvement as in claim 13 wherein said tungsten alloy is at least 75% tungsten.

15. The improvement as in claim 14 wherein said tungsten alloy is approximately 90% tungsten.

* * * * *